(12) United States Patent
 Welch

(10) Patent No.: US 11,713,680 B2
(45) Date of Patent: Aug. 1, 2023

(54) COMPOSITE FAN BLADE

(71) Applicant: Raytheon Technologies Corporation, Farmington, CT (US)

(72) Inventor: David A. Welch, Quaker Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/470,638

(22) Filed: Sep. 9, 2021

(65) Prior Publication Data

US 2021/0404343 A1 Dec. 30, 2021

Related U.S. Application Data

(62) Division of application No. 16/209,448, filed on Dec. 4, 2018, now Pat. No. 11,156,100.

(51) Int. Cl.
| | |
|---|---|
| *F01D 5/14* | (2006.01) |
| *B29C 64/153* | (2017.01) |
| *B22F 5/04* | (2006.01) |
| *B23K 26/34* | (2014.01) |
| *B23P 15/04* | (2006.01) |
| *F04D 29/32* | (2006.01) |
| *B33Y 10/00* | (2015.01) |
| *B33Y 80/00* | (2015.01) |

(52) U.S. Cl.
 CPC .............. *F01D 5/147* (2013.01); *B22F 5/04* (2013.01); *B23K 26/34* (2013.01); *B23P 15/04* (2013.01); *B29C 64/153* (2017.08); *F04D 29/324* (2013.01); *B33Y 10/00* (2014.12); *B33Y 80/00* (2014.12); *F05D 2240/303* (2013.01)

(58) Field of Classification Search
 CPC .......... F05D 2240/303; F05D 2220/36; F05D 2230/30; B33Y 10/00; B33Y 80/00; F04D 29/324; B29C 64/153; B23P 15/04; B23K 26/34; B22F 5/04; F01D 5/147; F01D 5/286
 See application file for complete search history.

(56) References Cited

U.S. PATENT DOCUMENTS

| | | | |
|---|---|---|---|
| 7,510,778 | B2 | 3/2009 | Bernard et al. |
| 9,963,971 | B2 | 5/2018 | Franchet et al. |
| 2016/0001407 | A1 | 1/2016 | Handen et al. |
| 2017/0022826 | A1* | 1/2017 | Read ............... F04D 29/324 |
| 2017/0081752 | A1 | 3/2017 | Hanley |

(Continued)

FOREIGN PATENT DOCUMENTS

| | | |
|---|---|---|
| EP | 3023519 A1 | 5/2016 |
| EP | 3121378 A1 | 1/2017 |

(Continued)

OTHER PUBLICATIONS

European Search Report Application No. EP19213669, dated Apr. 9, 2020; pp. 6.

*Primary Examiner* — Moshe Wilensky
(74) *Attorney, Agent, or Firm* — Cantor Colburn LLP

(57) ABSTRACT

A blade fabrication method is provided and includes additively manufacturing a core, securing the core to a mandrel, electroforming a leading edge sheath directly onto the core and the mandrel and removing the mandrel from the core and the leading edge sheath.

17 Claims, 5 Drawing Sheets

(56) References Cited

U.S. PATENT DOCUMENTS

| | | | |
|---|---|---|---|
| 2017/0234143 A1* | 8/2017 | Snyder | .................... F01D 25/12 165/51 |
| 2017/0274470 A1 | 9/2017 | Klein et al. | |
| 2018/0038385 A1 | 2/2018 | Welch | |
| 2018/0045216 A1 | 2/2018 | Karlen et al. | |
| 2019/0136697 A1 | 5/2019 | Foster | |

FOREIGN PATENT DOCUMENTS

| | | |
|---|---|---|
| EP | 3282090 A1 | 2/2018 |
| EP | 3480429 A1 | 5/2019 |
| WO | 2015009448 A1 | 1/2015 |

\* cited by examiner

COMPOSITE FAN BLADE

CROSS-REFERENCE TO RELATED APPLICATIONS

This application is a Divisional of application Ser. No. 16/209,448 filed, Dec. 4, 2018, the disclosure of which is incorporated herein by reference in its entirety.

BACKGROUND

Exemplary embodiments of the present disclosure relate generally to composite fan blades and, in one embodiment, to a composite fan blade with a fabricated leading edge sheath.

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors and the turbine section includes low and high pressure turbines.

Within the compressor section, high energy fluids aerodynamically interact with blades and vanes such that air flowing into the gas turbine engine can be compressed. Likewise, within the turbine section, high energy fluids, such as the products of combustion, aerodynamically interact with blades and vanes in order to expand and to thereby drive compressor and rotor rotation.

The blades in the turbine section in particular are typically exposed to high-temperatures and pressures and need to be structurally sound and cooled. As such, composite fan blades have been proposed and designed to serve as blades for turbine sections of gas turbine engines. Such composite fan blades can include a leading edge sheath to meet design targets. The leading edge sheath can be formed using leading edge deposition processes or direct laser metal sintering (DLMS) processes but it has been found that each of these has certain limitations.

BRIEF DESCRIPTION

According to an aspect of the disclosure, a blade fabrication method is provided and includes additively manufacturing a core, securing the core to a mandrel, electroforming a leading edge sheath directly onto the core and the mandrel and removing the mandrel from the core and the leading edge sheath.

In accordance with additional or alternative embodiments, the additively manufacturing comprises direct metal laser sintering (DMLS).

In accordance with additional or alternative embodiments, the additively manufacturing includes additively manufacturing the core to be one or more of solid, perforated and micro-latticed.

In accordance with additional or alternative embodiments, the securing includes inserting an alignment pin into the core and the mandrel.

In accordance with additional or alternative embodiments, the electroforming includes electroforming the leading edge sheath to include an elongate leading edge portion that extends forwardly from a leading edge of the core and sidewall portions that extend rearwardly from a trailing edge of the elongate leading edge portion along the core and a forward portion of the mandrel.

In accordance with additional or alternative embodiments, the method further includes locally thickening the leading edge sheath to facilitate retention of the core by the leading edge sheath.

In accordance with additional or alternative embodiments, the removing includes inserting one or more wedges between the leading edge sheath and the mandrel.

In accordance with additional or alternative embodiments, the method further includes bonding a blade body to the core and the leading edge sheath and the bonding includes adhering the blade body to the core and the leading edge sheath.

According to another aspect of the disclosure, a method of fabricating a blade for use in a flowpath is provided and includes additively manufacturing a core having a length sufficient to span a substantial fraction of the flowpath, securing the core to a mandrel having a length sufficient to span the substantial fraction of the flowpath, electroforming a leading edge sheath directly onto the core and the mandrel, separating the mandrel from the leading edge sheath along an entirety of the length of the mandrel and removing the mandrel from the core and the leading edge sheath.

In accordance with additional or alternative embodiments, the additively manufacturing includes direct metal laser sintering (DMLS).

In accordance with additional or alternative embodiments, the additively manufacturing includes additively manufacturing the core to be one or more of solid, perforated and micro-latticed.

In accordance with additional or alternative embodiments, the securing includes inserting an alignment pin into the core and the mandrel.

In accordance with additional or alternative embodiments, the electroforming includes electroforming the leading edge sheath to include an elongate leading edge portion that extends forwardly from a leading edge of the core and sidewall portions that extend rearwardly from a trailing edge of the elongate leading edge portion along the core and a forward portion of the mandrel.

In accordance with additional or alternative embodiments, the method further includes locally thickening the leading edge sheath to facilitate retention of the core by the leading edge sheath.

In accordance with additional or alternative embodiments, the removing includes inserting one or more wedges between the leading edge sheath and the mandrel.

In accordance with additional or alternative embodiments, the method further includes bonding a blade body to the core and the leading edge sheath and the bonding includes adhering the blade body to the core and the leading edge sheath.

According to another aspect of the disclosure, a leading edge sheath assembly for a blade is provided and includes an additively manufactured core and a leading edge sheath. The additively manufactured core includes a leading edge, a trailing edge and first and second sidewalls extending from opposite sides of the leading edge to opposite sides of the trailing edge. The leading edge sheath is electroformed directly onto the core and includes an elongate leading edge portion that extends forwardly from the leading edge of the core and sidewall portions that extend rearwardly from a trailing edge of the elongate leading edge portion along and beyond the first and second sidewalls of the core.

In accordance with additional or alternative embodiments, the core is one or more of solid, perforated and microlatticed.

In accordance with additional or alternative embodiments, a fan blade is provided and includes the leading edge sheath assembly, a blade body and adhesive disposed to adhere interior surfaces of the sidewall portions to sidewalls of the blade body and the trailing edge of the core to a leading edge of the blade body.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
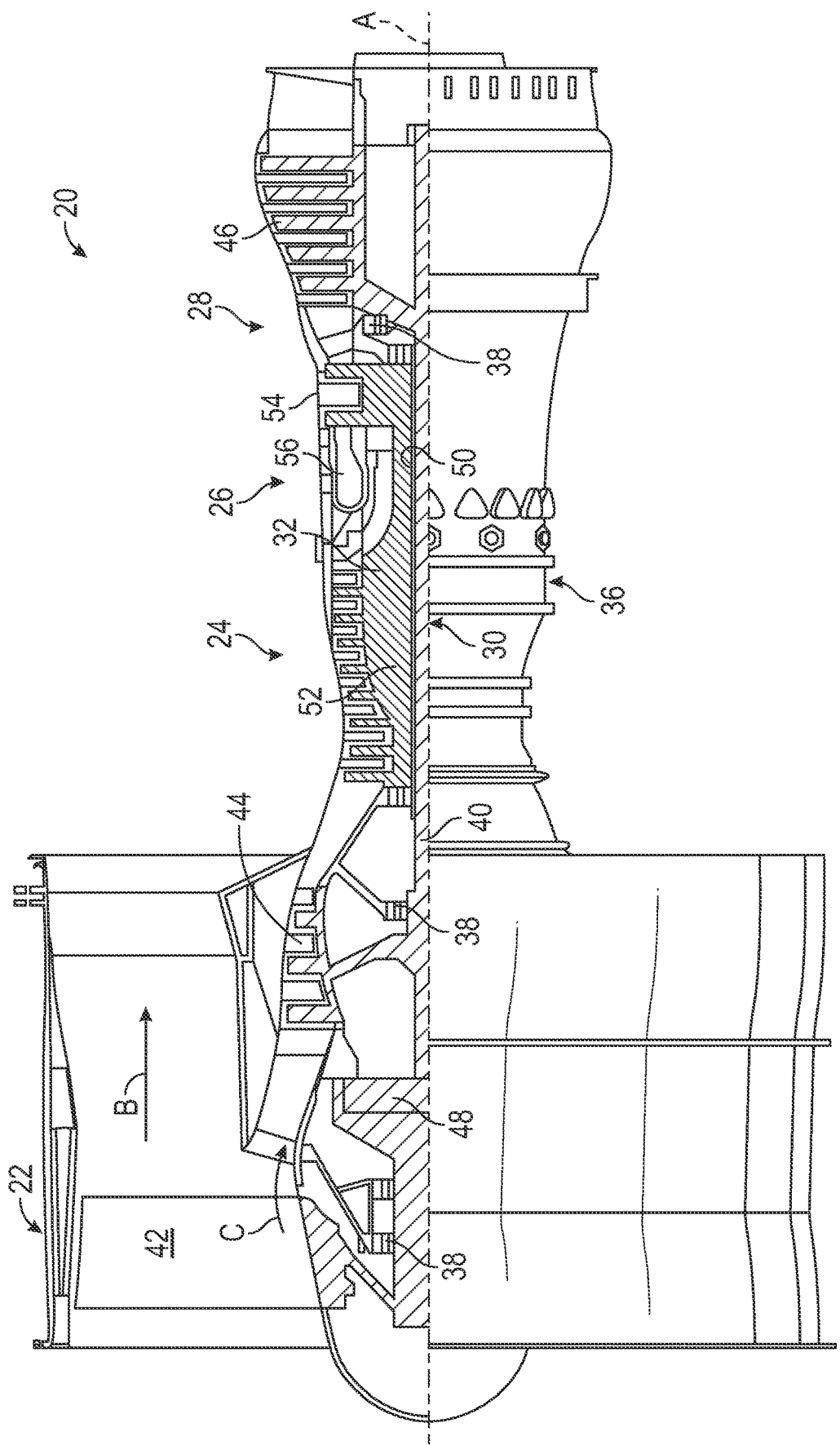
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

The gas turbine engine 20 in one example is a high-bypass geared aircraft engine. In a further example, the gas turbine engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the gas turbine engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ^{\circ} R)/(518.7^{\circ} R)]^{0.5}$. The "Low corrected fan tip speed" as disclosed herein according to one non-limiting embodiment is less than about 1150 ft/second (350.5 m/sec).

Figure 2:
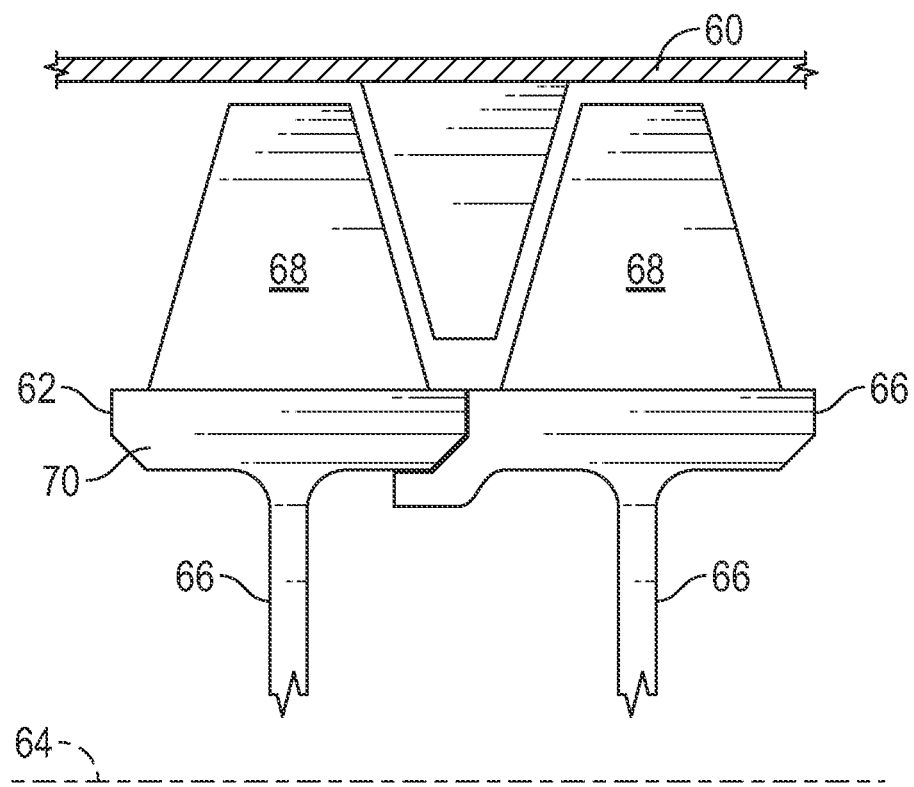
FIG. 2 is a partial cross-sectional view of an embodiment of a portion of a compressor section of the gas turbine engine of FIG. 1.

Referring now to FIG. 2, either or both of the low pressure compressor 44 or the high pressure compressor 52 includes a compressor case 60, in which compressor rotors 62 are arranged along an engine axis 64 about which the compressor rotors 62 rotate. Each compressor rotor 62 includes a rotor disc 66 with a platform 70 and a plurality of rotor blades 68 extending radially outwardly from the platform 70 (i.e., a rotor stack). In some embodiments, the rotor disc 66 and the plurality of rotor blades 68 are a single, unitary structure, an integrally bladed compressor rotor 62. In other embodiments, the rotor blades 68 are each installed to the rotor disc 66 via, for example, a dovetail joint where a tab or protrusion at the rotor blade 68 is inserted into a corresponding slot in the platform 70.

Figure 3:
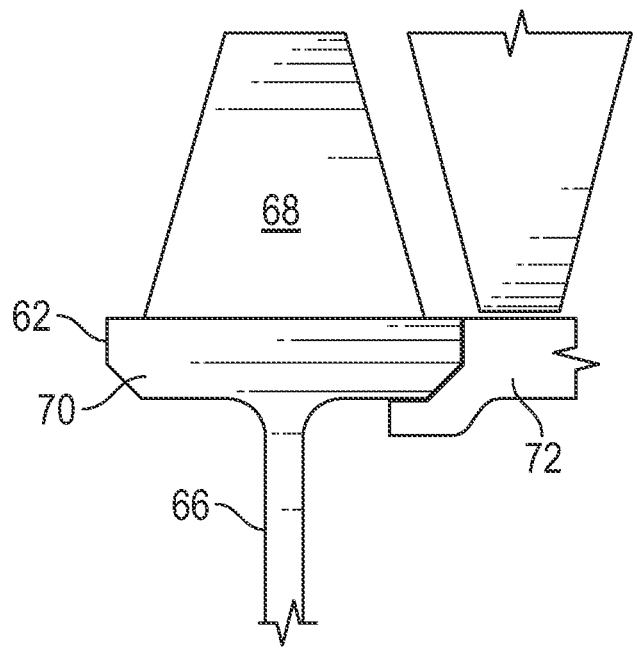
FIG. 3 is a partial cross-sectional view of another embodiment of a portion of a compressor section of the gas turbine engine of FIG. 1.

As shown in FIG. 2, axially adjacent compressor rotors 62 may be joined to each other, while in other embodiments, as shown in FIG. 3, the compressor rotor 62 may be joined to another rotating component, such as a spacer 72. The compressor rotor 62 is secured to the adjacent rotating component by an interference fit or a "snap fit," which in some embodiments is combined with another mechanical fastening, such as a plurality of bolts (not shown) to secure the components and to form or define a snap location.

As will be described below, a composite fan blade is provided for use in a flowpath, such as a flowpath of one or more of the fan section 22, the compressor section 24, the combustor section 26 and the turbine section 28 of the gas turbine engine 20 described above. The composite fan blade includes a leading edge sheath that is formed by an improved leading edge deposition process combined with a direct metal laser sinterin (DMLS) process. The composite fan blade can thus be lightweight. The composite fan blade has a forward nose that is filled with a solid or semi-solid (e.g., perforated or micro-latticed) core, which is additively manufactured or formed from the DMLS process, and a leading edge sheath or outer skin that is formed from a uniform or a slightly non-uniform deposition process. The core serves to address strain capabilities of leading edge of the composite fan blade. In addition, the presence of the core allows for the leading edge sheath or outer skin to be deposited directly within the capabilities of the deposition process.

Figure 5:
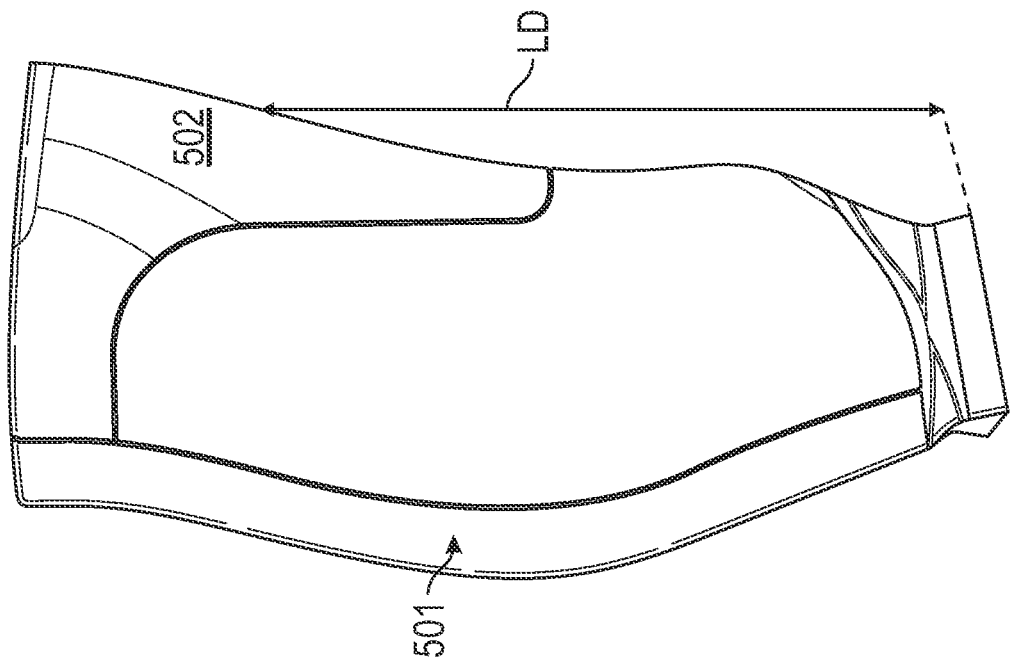
FIG. 5 is a perspective view of a composite fan blade in accordance with embodiments.
Figure 4:
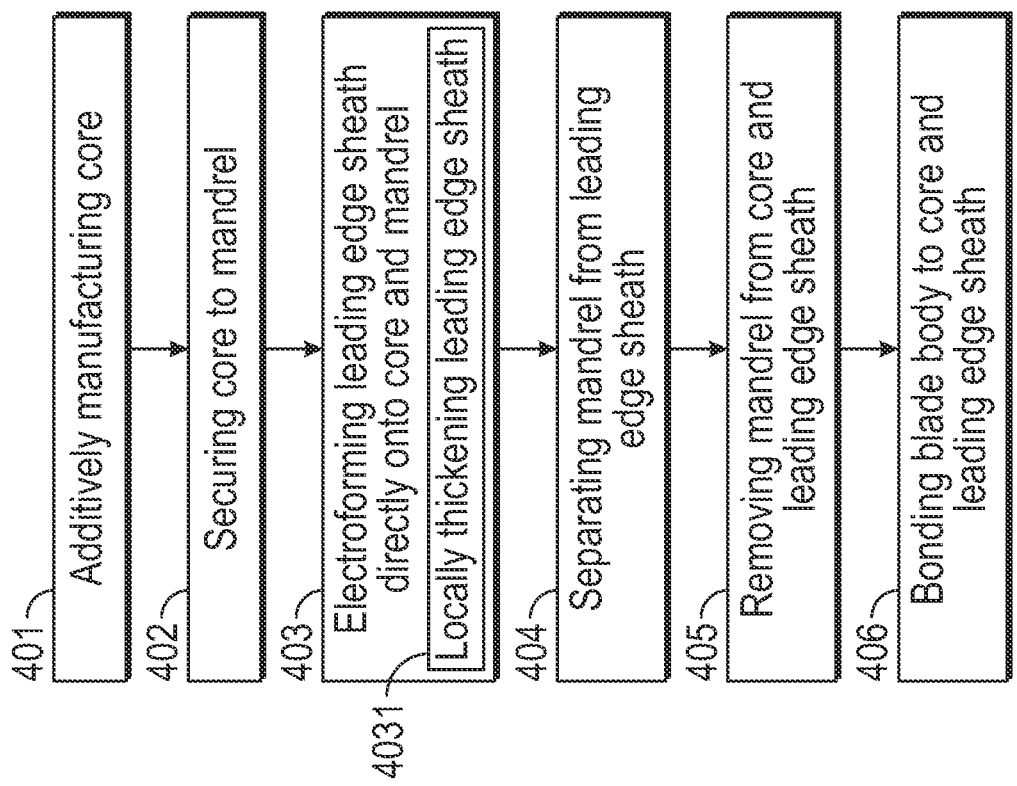
FIG. 4 is a flow diagram illustrating a method of fabricating a composite fan blade in accordance with embodiments.
Figure 6:
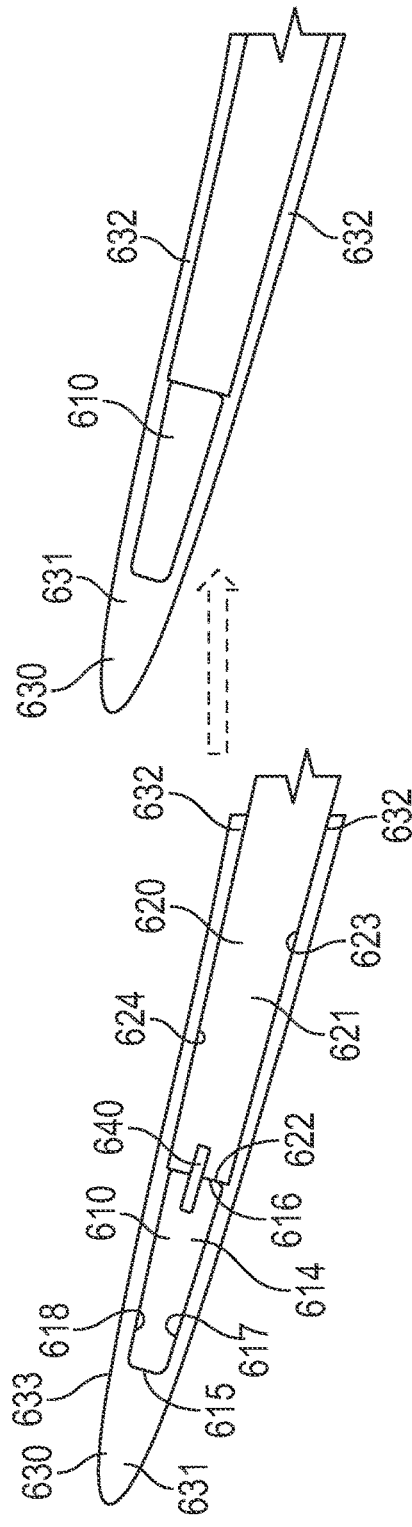
FIG. 6 is a diagram illustrating a method of fabricating a leading edge sheath of a composite fan blade in accordance with embodiments.

With reference to FIGS. 4, 5 and 6, a method of fabricating a composite fan blade 501 is provided such that the composite fan blade 501 can be installed in a flowpath, such as a flowpath of one or more of the fan section 22, the compressor section 24, the combustor section 26 and the turbine section 28 of the gas turbine engine 20 described above. The method includes additively manufacturing a core 610 (see FIG. 6) to have a length that extends along the length-wise dimension LD and is sufficient to span a substantial fraction of the flowpath into which the composite fan blade 501 is to be installed (401). The method further includes securing the core 610 to a mandrel 620 (see FIG. 6) where the mandrel 620 has a length that also extends along the length-wise dimension LD and which is also sufficient to span the substantial fraction of the flowpath (402). In addition the method includes electroforming a leading edge sheath 630 (see FIG. 6) directly onto the core 610 and the mandrel 620 (403), separating the mandrel 620 from the leading edge sheath 630 along an entirety of the length of the mandrel 620 (404) and removing the mandrel 620 from the core 610 and the leading edge sheath 630 (405).

Figure 8:
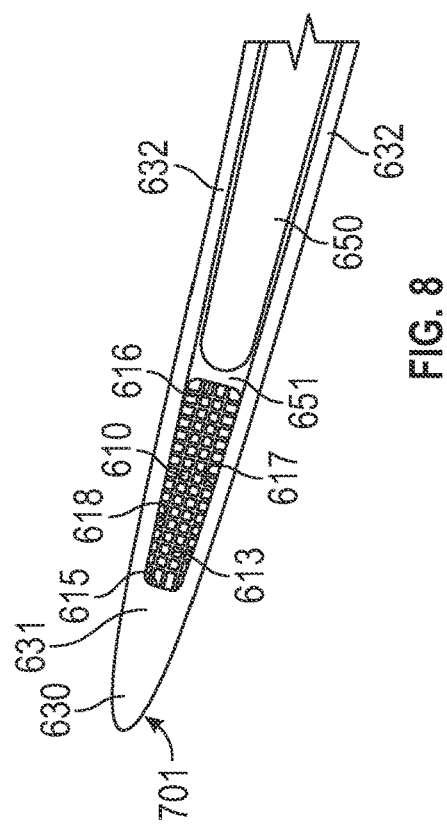
FIG. 8 is a cross-sectional view of a composite fan blade with a leading edge sheath in accordance with embodiments.
Figure 7:
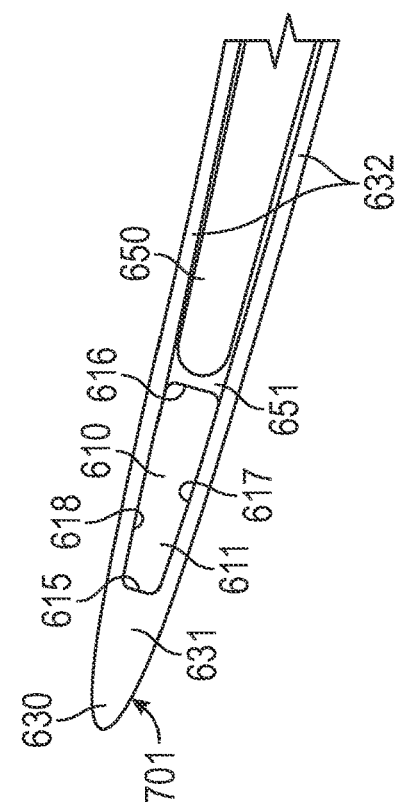
FIG. 7 is a cross-sectional view of a composite fan blade with a leading edge sheath in accordance with embodiments.
Figure 9:
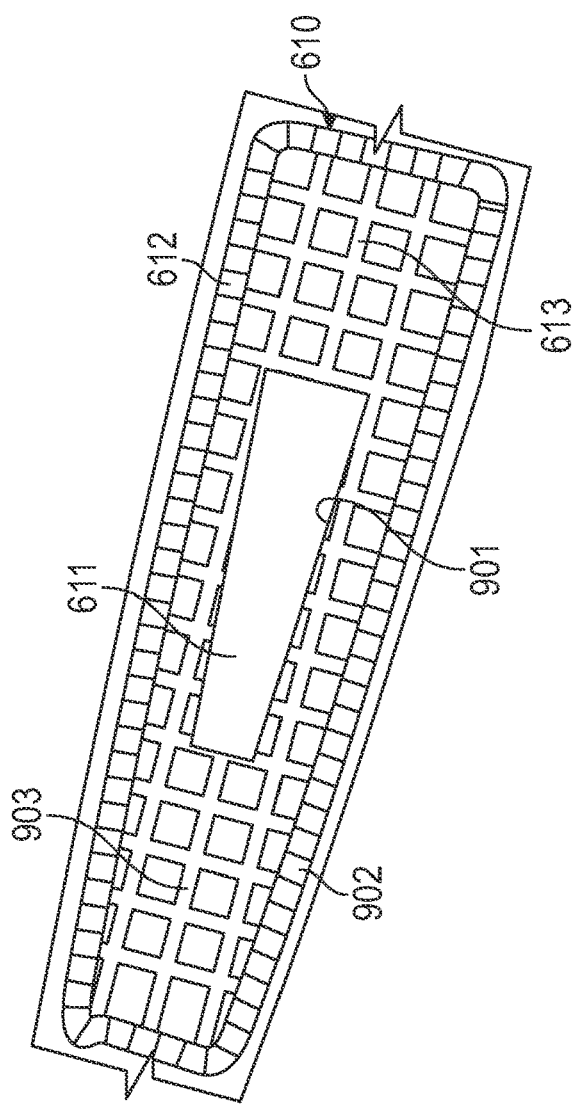
FIG. 9 is an enlarged cross-sectional view of a core of a leading edge sheath of a composite fan blade in accordance with embodiments.

In accordance with embodiments and with reference to FIGS. 7, 8 and 9, the additive manufacturing of the core 610 of operation 401 can include DMLS processing or another similar type of additive manufacturing and can result in the core 610 being one or more of solid 611 (see FIGS. 7 and 9), perforated 612 (see FIG. 9) and micro-latticed 613 (see FIGS. 8 and 9). That is, as shown in FIG. 9, a first portion of the core 610 (e.g., a central portion 901) can be solid 611, a second portion of the core 610 (e.g., an outer portion 902) can be perforated 612 and a third portion of the core 610 (e.g., an intermediate portion 903 between the central portion 901 and the outer portion 902) can be micro-latticed 613.

With reference back to FIG. 6, the core 610 is additively manufactured to have a core body 614 with the above-noted length extending along the length-wise dimension LD (see FIG. 5) and with a leading edge 615, a trailing edge 616 opposite the leading edge 615, a pressure surface or first side 617 and a suction surface or second side 618. The first and second sides 617 and 618 extend from opposite sides of the leading edge 615 to opposite sides of the trailing edge 616. The core body 614 can have a taper from the trailing edge 616 toward the leading edge 615 to facilitate the formation of a leading edge sheath assembly having a nose-cone shape.

The mandrel 620 is provided with a mandrel body 621 that can mimic the overall shape 502 of the composite fan blade 501. The mandrel body 621 has the above-noted length extending along the length-wise dimension LD (see FIG. 5) and a leading edge 622, a pressure surface or first side 623 and a suction surface or second side 624. The first and second sides 623 and 624 extend rearwardly from opposite sides of the leading edge 622. The mandrel body 621 can have a taper toward the leading edge 622 to facilitate the formation of a leading edge sheath assembly having a cross-sectional nose-cone shape.

With continued reference to FIG. 6 and with reference back to FIG. 4, the securing of the core 610 to the mandrel 620 of operation 402 can be executed such that the trailing edge 616 of the core 610 is secured to the leading edge 622 of the mandrel 620. In addition, the securing of operation 402 can be achieved by inserting an alignment pin 640 into the trailing edge 616 of the core 610 and the leading edge 622 of the mandrel 620. It is to be understood that the alignment pin 640 can be provided as multiple alignment pins 640 and that the multiple alignment pins 640 can each be inserted into the trailing edge 616 of the core 610 and the leading edge 622 of the mandrel 620 along the respective lengths thereof.

With continued reference to FIG. 6 and with reference back to FIG. 4, the electroforming of the leading edge sheath 630 of operation 403 can be executed directly on the core 610 and the mandrel 620 to retain front/forward solidity for in-service reparability. The leading edge sheath 630 thus includes an elongate leading edge portion 631 and sidewall portions 632. The elongate leading edge portion 631 extends forwardly from the leading edge 615 of the core 610. The sidewall portions 632 extend rearwardly from a trailing edge 633 of the elongate leading edge portion 631 (the trailing edge 633 can be defined as being coplanar with the leading edge 615 of the core 610), along the first and second sides 617 and 618 of the core 610 and along at least respective forward portions of the first and second sides 623 and 624 of the mandrel 620. Exterior surfaces of the elongate leading edge portion 631 and the sidewall portions 632 are smooth and continuous and tapered similarly to the tapers of the core 610 and the mandrel 620 such that the leading edge sheath 630 has the above-noted cross-sectional nose-cone shape.

Figure 10:
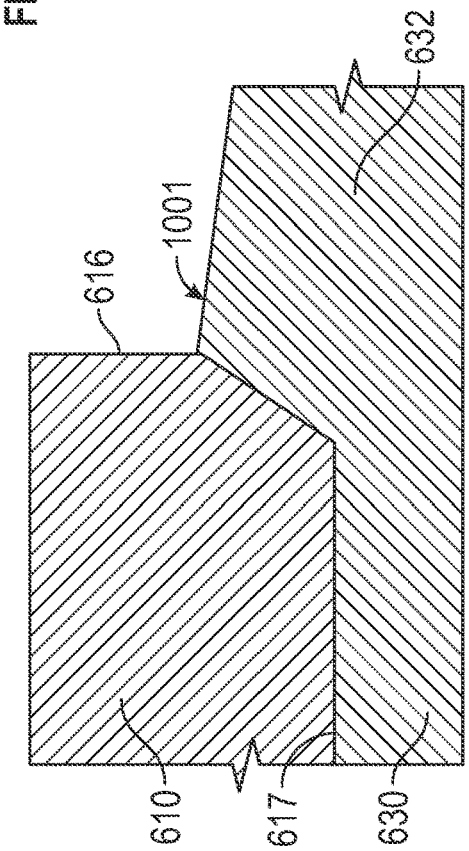
FIG. 10 is an enlarged cross-sectional view of a locally thickened portion of a leading edge sheath for core retention in accordance with embodiments.

With continued reference to FIGS. 4 and 6 and with additional reference to FIG. 10, the electroforming of the leading edge sheath 630 of operation 403 can include locally thickening the leading edge sheath 630 to facilitate retention of the core 610 by the leading edge sheath 630 (4031). As shown in FIG. 10, such local thickening can result in the sidewall portions 632 of the leading edge sheath 630 including a thickened section 1001 which extends partially around the trailing edge 616 of the core 610. This thickened section 1001 can serve to retain the core 610 within the leading edge sheath 630 when the mandrel 620 is separated and then removed from the leading edge sheath 630 in operations 404 and 405.

Figure 11:
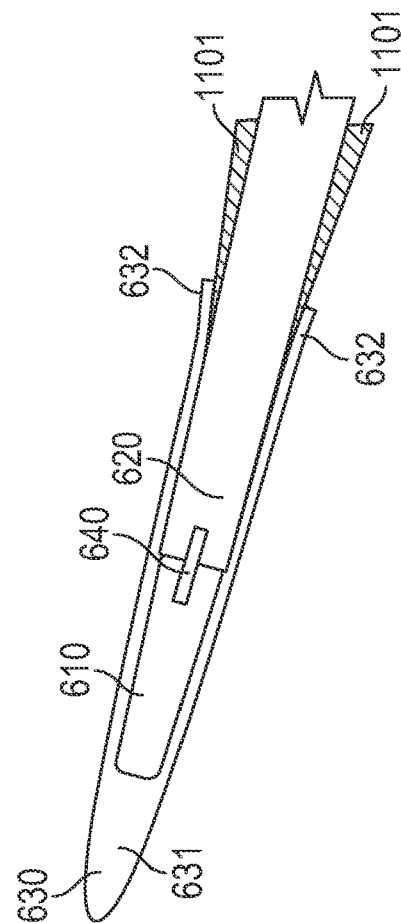
FIG. 11 is a cross-sectional view illustrating a separation of sidewall portions of a leading edge sheath of a composite fan blade from a mandrel using wedges in accordance with embodiments.

With continued reference to FIGS. 4 and 6 and with additional reference to FIG. 11, the separating of the mandrel 620 from the leading edge sheath 630 along an entirety of the length of the mandrel 620 of operation 404 can include an insertion of one or more wedges 1101 between the sidewall portions 632 of the leading edge sheath 630 and the first and second sides 623 and 624 of the mandrel 620.

With reference back to FIG. 4 and to FIGS. 7 and 8, once the mandrel 620 is removed from the core 610 and the leading edge sheath 630 in operation 405, a blade body 650 (see FIGS. 7 and 8) can be bonded to the trailing edge 616 of the core 610 and to interior surfaces of the sidewall portions 632 of the leading edge sheath 630 (406). The bonding can be provided by an adhesive 651, such as a suitable epoxy or another similar bonding adhesive.

As shown in FIGS. 7, 8 and 9, as a result of the method described above, a leading edge sheath assembly 701 can be provided for a blade, such as the composite fan blade 501 of FIG. 5. The leading edge sheath assembly 701 includes the additively manufactured core 610 and the leading edge sheath 630. The core 610 is one or more of solid 611 (see FIGS. 7 and 9), perforated 612 (see FIG. 9) and microlatticed 613 (see FIGS. 8 and 9) and includes the leading edge 615, the trailing edge 616 and the first and second sidewalls 617 and 618. The leading edge sheath 630 is electroformed directly onto the core 610 and includes the elongate leading edge portion 631 and the sidewall portions 632.

In accordance with embodiments, the leading edge sheath assembly 701 or the blade as a whole (i.e., the composite fan blade 501 of FIG. 5) can also include the blade body 650 and the adhesive 651.

Benefits of the features described herein are the provision of a lightweight composite fan blade 501 through easy and tailorable fabrication methods and processes.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade fabrication method, comprising:
    additively manufacturing a core;
    securing the core to a mandrel, the securing comprising inserting an alignment pin into the core and the mandrel;
    electroforming a leading edge sheath directly onto the core and the mandrel; and
    removing the mandrel from the core and the leading edge sheath.

2. The blade fabrication method according to claim 1, wherein the additively manufacturing comprises direct metal laser sintering (DMLS).

3. The blade fabrication method according to claim 1, wherein the additively manufacturing comprises additively manufacturing the core to be latticed in interior portions thereof and perforated at outer portions thereof.

4. The blade fabrication method according to claim 1, wherein the electroforming comprises electroforming the leading edge sheath to comprise:
    an elongate leading edge portion that extends forwardly from a leading edge of the core; and
    sidewall portions that extend rearwardly from a trailing edge of the elongate leading edge portion along the core and a forward portion of the mandrel.

5. The blade fabrication method according to claim 4, further comprising locally thickening the sidewall portions of the leading edge sheath around a trailing edge of the core to form, for each of the sidewall portions, a thickened section that extends partially around and abuts with a proximal section of the trailing edge of the core and that facilitates retention of the core by the leading edge sheath.

6. The blade fabrication method according to claim 1, wherein the removing comprises inserting one or more wedges between the leading edge sheath and the mandrel.

7. The blade fabrication method according to claim 1, further comprising bonding a blade body to the core and the leading edge sheath, wherein the bonding comprises adhering the blade body to the core and the leading edge sheath.

8. A method of fabricating a blade for use in a flowpath, comprising:
additively manufacturing a core having a length sufficient to span a fraction of the flowpath;
securing the core to a mandrel having a length sufficient to span the fraction of the flowpath, the securing comprising inserting an alignment pin into the core and the mandrel;
electroforming a leading edge sheath directly onto the core and the mandrel;
separating the mandrel from the leading edge sheath along an entirety of the length of the mandrel; and
removing the mandrel from the core and the leading edge sheath.

9. The method according to claim 8, wherein the additively manufacturing comprises direct metal laser sintering (DMLS).

10. The method according to claim 8, wherein the additively manufacturing comprises additively manufacturing the core to be latticed in interior portions thereof and perforated at outer portions thereof.

11. The method according to claim 8, wherein the electroforming comprises electroforming the leading edge sheath to comprise:
an elongate leading edge portion that extends forwardly from a leading edge of the core; and
sidewall portions that extend rearwardly from a trailing edge of the elongate leading edge portion along the core and a forward portion of the mandrel.

12. The method according to claim 11, further comprising locally thickening the sidewalls portions of the leading edge sheath around a trailing edge of the core to form, for each of the sidewall portions, a thickened section that extends partially around and abuts with a proximal section of the trailing edge of the core and that facilitates retention of the core by the leading edge sheath.

13. The method according to claim 8, wherein the removing comprises inserting one or more wedges between the leading edge sheath and the mandrel.

14. The method according to claim 8, further comprising bonding a blade body to the core and the leading edge sheath, wherein the bonding comprises adhering the blade body to the core and the leading edge sheath.

15. A method of assembling a leading edge sheath assembly for a blade having a blade body, the method comprising:
additively manufacturing a core perforated at outer portions thereof and latticed in interior portions thereof, the core comprising leading and trailing edges and first and second sidewalls extending between the leading and training edges;
securing the core to a mandrel;
electroforming a leading edge sheath directly onto the core and the mandrel, the leading edge sheath comprising:
an elongate leading edge portion extending forwardly from the leading edge of the core; and
sidewall portions extending rearwardly from the elongate leading edge portion along and beyond the first and second sidewalls of the core, each of the sidewall portions comprising a thickened section extending partially around and abuts with a proximal section of the trailing edge of the core;
separating the mandrel from the leading edge sheath; and
removing the mandrel from the core.

16. The method according to claim 15, wherein the separating of the mandrel from the leading edge sheath comprises inserting one or more wedges between the leading edge sheath and the mandrel.

17. The method according to claim 15, further comprising bonding a blade body to the core and the leading edge sheath, wherein the bonding comprises adhering the blade body to the core and the leading edge sheath.

* * * * *